US012297644B2

(12) United States Patent
Andrawes

(10) Patent No.: US 12,297,644 B2
(45) Date of Patent: May 13, 2025

(54) CONCRETE PRODUCT COMPRISING AN ADAPTIVE PRESTRESSING SYSTEM, AND METHOD OF LOCALLY PRESTRESSING A CONCRETE PRODUCT

(71) Applicant: The Board of Trustees of the University of Illinois, Urbana, IL (US)

(72) Inventor: Bassem Andrawes, Mahomet, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 192 days.

(21) Appl. No.: 17/783,874

(22) PCT Filed: Dec. 7, 2020

(86) PCT No.: PCT/US2020/063536

§ 371 (c)(1),
(2) Date: Jun. 9, 2022

(87) PCT Pub. No.: WO2021/118902

PCT Pub. Date: Jun. 17, 2021

(65) Prior Publication Data

US 2023/0024816 A1 Jan. 26, 2023

Related U.S. Application Data

(60) Provisional application No. 62/947,674, filed on Dec. 13, 2019.

(51) Int. Cl.
*E04C 5/08* (2006.01)
*B28B 23/04* (2006.01)
(Continued)

(52) U.S. Cl.
CPC .............. *E04C 5/08* (2013.01); *B28B 23/046* (2013.01); *C22C 38/00* (2013.01); *E04C 5/03* (2013.01);
(Continued)

(58) Field of Classification Search
CPC . E04C 5/08; E04C 5/03; B28B 23/046; C22C 38/00; C21D 2201/01
(Continued)

(56) References Cited

U.S. PATENT DOCUMENTS 2,737,802 A * 3/1956 Bakker ..................... E04C 5/08 52/223.13
2,887,130 A * 5/1959 Kell ........................ B28B 21/62 52/223.13
(Continued)

FOREIGN PATENT DOCUMENTS

CN 104806022 A 7/2015
CN 104816381 A 8/2015
(Continued)

OTHER PUBLICATIONS

International Search Report and Written Opinion from corresponding International Application No. PCT/US2020/063536, Mar. 25, 2021, 12 pp.
(Continued)

*Primary Examiner* — Paola Agudelo
*Assistant Examiner* — Adam G Barlow
(74) *Attorney, Agent, or Firm* — Crowell & Moring LLP

(57) ABSTRACT

A concrete product comprising an adaptive prestressing system includes a concrete body and a composite wire embedded within the concrete body at a predetermined location. The composite wire comprises anchored end portions, each of which comprises a bonded wire segment constrained within the concrete body to resist axial motion,
(Continued)

and an activable central portion between the end portions. The activable central portion comprises a shape memory alloy (SMA) wire segment and is axially movable within the concrete body. When heated at or above an austenite transformation temperature, the SMA wire segment contracts and the activable central portion exerts a tensile force on the end portions, thereby applying a compressive prestress within the concrete body at the predetermined location.

18 Claims, 11 Drawing Sheets

(51) Int. Cl.
*C22C 38/00* (2006.01)
*E04C 5/03* (2006.01)
*E04G 23/02* (2006.01)

(52) U.S. Cl.
CPC ..... *E04G 23/0218* (2013.01); *C21D 2201/01* (2013.01)

(58) Field of Classification Search
USPC .................. 52/223.1, 223.6, 223.13, 223.14
See application file for complete search history.

(56) References Cited

U.S. PATENT DOCUMENTS 2,921,463 A * 1/1960 Goldfein .................. E04C 5/07 52/309.3
3,119,203 A * 1/1964 Finsterwalder ......... E04C 5/125 52/223.13
3,343,808 A * 9/1967 Howlett .................. E04G 21/12 254/133 R
3,396,943 A * 8/1968 Howlett ................ E04G 21/121 254/228
3,399,434 A * 9/1968 Kelly ........................ F16B 7/22 425/173
3,460,300 A * 8/1969 Howlett .................... E04H 7/20 52/223.3
3,504,938 A * 4/1970 Howlett ................ E04G 21/121 403/368
3,513,609 A * 5/1970 Lang ......................... E04C 5/08 52/223.13
3,579,931 A * 5/1971 Lang ......................... E04C 5/08 52/223.13
3,843,288 A * 10/1974 Howlett ................ B28B 23/043 52/223.13
3,899,384 A * 8/1975 Kelly ...................... B29C 48/15 156/433
4,900,193 A * 2/1990 MacKinnon ............ E02D 5/523 52/223.13
5,093,065 A 3/1992 Creedon
5,573,852 A 11/1996 Thal
5,858,082 A 1/1999 Cruz et al.
6,865,791 B2 * 3/2005 Cook .................... F16L 55/179 148/563
9,758,968 B2 9/2017 Leinenbach et al.
10,246,887 B2 * 4/2019 Motavalli ............... E04G 21/12
11,697,944 B2 * 7/2023 Andrawes ............... B28B 23/04 52/223.13
2002/0157333 A1 * 10/2002 Kadotani ................ E04C 5/165 52/223.13
2010/0104357 A1 * 4/2010 Al-Tuhami ............. E04C 5/165 403/312
2016/0053492 A1 * 2/2016 Leinenbach .............. E04B 1/16 52/223.14
2016/0305140 A1 * 10/2016 Wilson .................... E04C 5/165
2017/0314277 A1 11/2017 Motavalli et al.
2018/0016789 A1 * 1/2018 Sorkin .................... E04C 5/122
2018/0023297 A1 * 1/2018 Dawood ................. B29C 73/10 29/402.09
2022/0341093 A1 * 10/2022 Choi ........................ D07B 5/00
2023/0127567 A1 * 4/2023 Pang ....................... C22C 38/14 148/328
2024/0129194 A1 * 4/2024 Mueck .................... G06F 21/64

FOREIGN PATENT DOCUMENTS

KR 20110006072 A 1/2011
KR 101946731 B1 2/2019

OTHER PUBLICATIONS

Andrawes et al., "Active Confinement of Reinforced Concrete Bridge Columns Using Shape Memory Alloys," *Journal of Bridge Engineering*, 15 (2010), pp. 81-89.

* cited by examiner

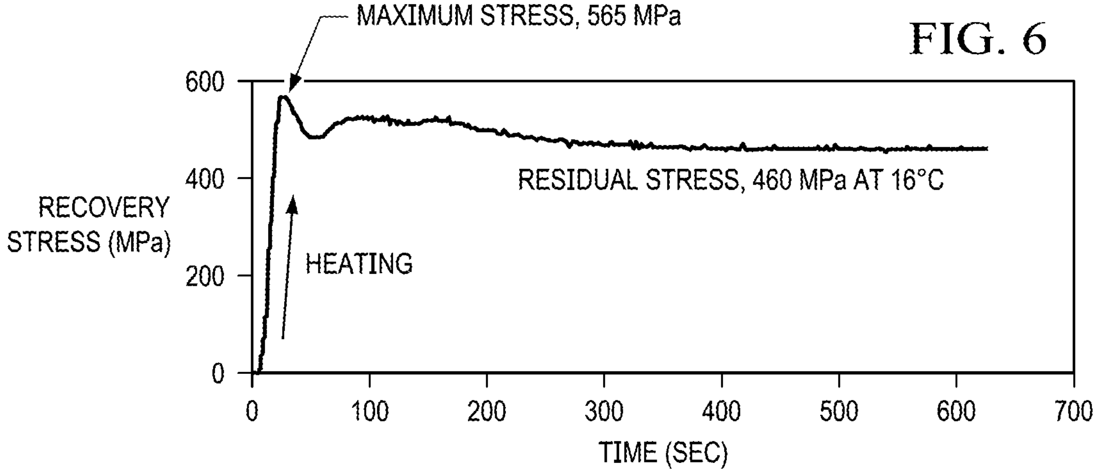
FIG. 6
FIG. 7
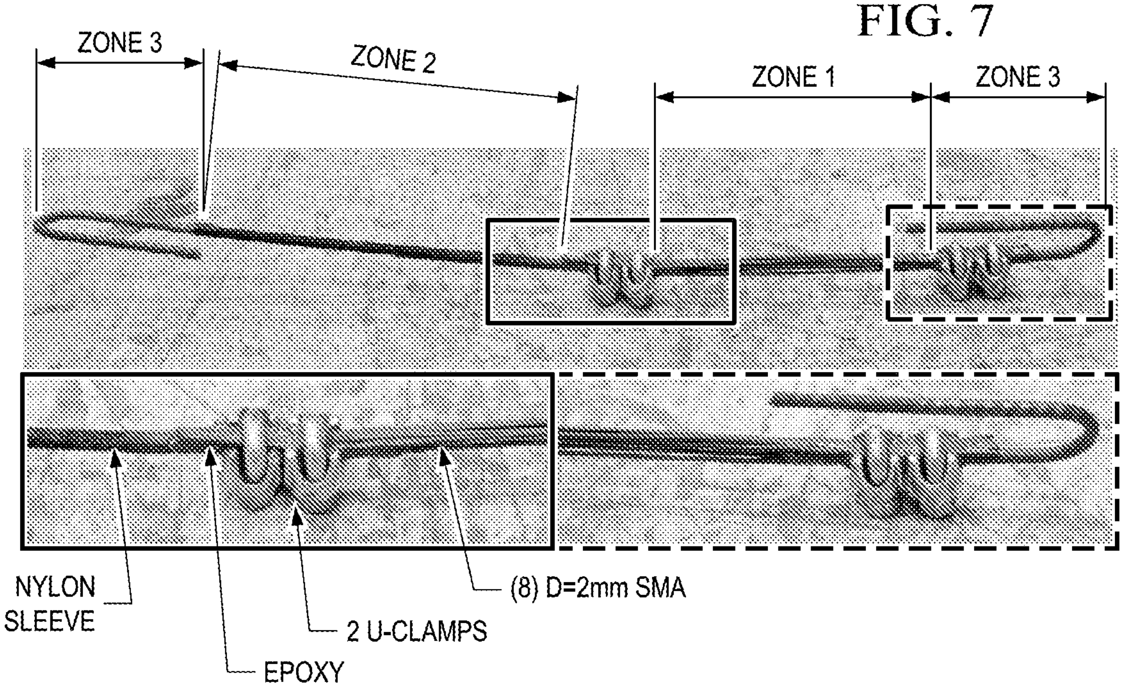

CONCRETE PRODUCT COMPRISING AN ADAPTIVE PRESTRESSING SYSTEM, AND METHOD OF LOCALLY PRESTRESSING A CONCRETE PRODUCT

RELATED APPLICATIONS

The present patent document is the U.S. national stage of International Application No. PCT/US2020/063536, which was filed on Dec. 7, 2020, and which claims the benefit of priority under 35 U.S.C. § 119 (e) to U.S. Provisional Patent Application No. 62/947,674, which was filed on Dec. 13, 2019. Both of the aforementioned patent applications are hereby incorporated by reference in their entirety.

TECHNICAL FIELD

The present disclosure is related generally to concrete products and more particularly to concrete products comprising an adaptive prestressing system.

BACKGROUND

Concrete is characteristically strong in compression but weak in tension. To address this shortcoming, internal compressive stresses may be generated in concrete products such as railroad ties and bridge girders during fabrication to counteract tensile stresses that may be imposed in service. The compressive stress is usually imparted by a single-strand wire, cable or bar ("tendon") made of a high tensile strength material such as steel. The tendon is typically tensioned in a frame or between anchorages that are sized to contain the concrete structure. Once the tendon is under tension, the concrete is cast over the tendon and begins to cure. After the concrete has developed sufficient strength, the tension is slowly released from the frame or anchorage to transfer the compressive stress to the concrete. The force is transmitted to the concrete over a certain distance from each end of the tendon, and a prestressed concrete structure is produced according to conventional methods.

There are limitations to such prestressing approaches, however. For example, the compressive prestress is necessarily applied to the entire length or depth of the concrete product and cannot be localized to just a single region. Also, the prestress is applied to the concrete product as part of the fabrication process using costly external hydraulic jacking, which requires an extended production time and limits the output of concrete products. In addition, using conventional approaches, the level of prestress cannot be adjusted after fabrication.

BRIEF SUMMARY

A concrete product comprising an adaptive prestressing system includes a concrete body and a composite wire embedded within the concrete body at a predetermined location. The composite wire comprises anchored end portions, each of which comprises a bonded wire segment constrained within the concrete body to resist axial motion, and an activable central portion between the end portions. The activable central portion comprises a shape memory alloy (SMA) wire segment and is axially movable within the concrete body. When heated at or above an austenite transformation temperature, the SMA wire segment contracts and the activable central portion exerts a tensile force on the end portions, thereby applying a compressive prestress within the concrete body at the predetermined location.

A method of locally prestressing a concrete product comprising an adaptive prestressing system includes heating the SMA wire segment of the concrete product referred to above to at least an austenite transformation temperature thereof. The heating induces contraction of the SMA wire segment, and the activable central portion comprising the SMA wire segment exerts a tensile force on the end portions. A compressive prestress is thus applied within the concrete body at the predetermined location.

A method of making a concrete product comprising an adaptive prestressing system includes: forming a shape memory alloy (SMA) wire segment into an elongated shape, the SMA wire segment being martensitic; forming a composite wire including the SMA wire segment; positioning the composite wire within a mold; pouring a concrete mix into the mold and over the composite wire; and curing the concrete mix to obtain a concrete body comprising the composite wire embedded at a predetermined location therein. Thus, a concrete product including an adaptive prestressing system is formed.

BRIEF DESCRIPTION OF THE DRAWINGS

FIG. 6 shows recovery stress as function of time and reveals that the SMA wire segments embedded in concrete in the railroad tie test specimens of FIGS. 5A-5C are applying the prestressing as designed.

FIG. 7 is an image of a composite wire including steel and SMA wire segments connected with U-clamps and epoxy.

DETAILED DESCRIPTION

An adaptive prestressing system has been developed that allows localized prestress forces to be introduced into concrete products after fabrication (e.g., in the field) and then monitored and adjusted if needed during service. The concrete product may be a railroad tie (or "crosstie"), a bridge girder, roof slab, floor slab, pavement, pole, wall panel, or another concrete structure.

Figure 1A:
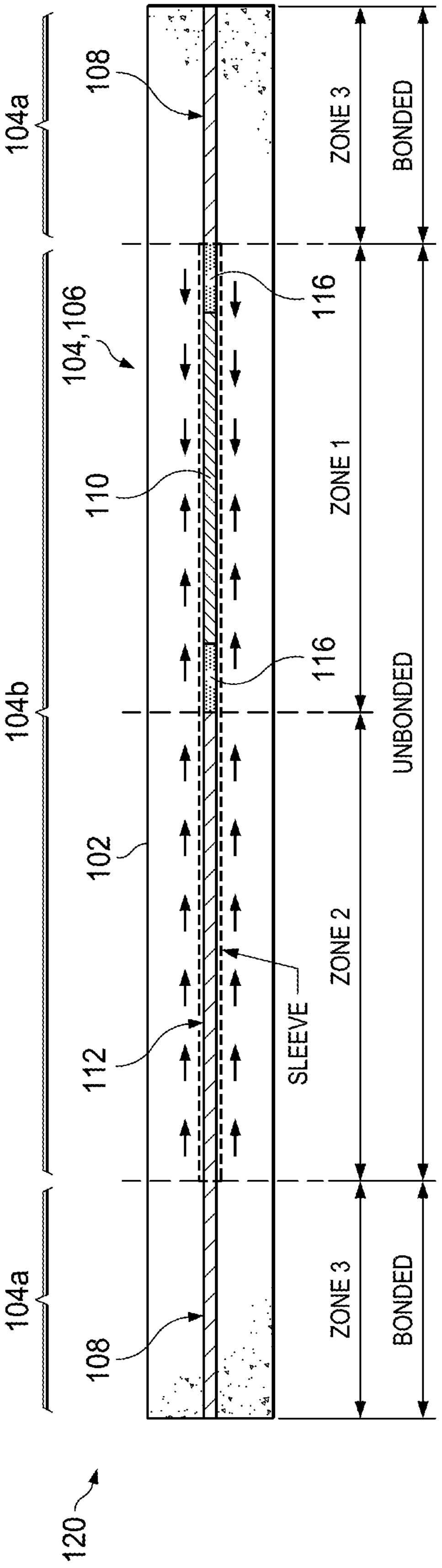
FIGS. 1A and 1B each show part of a concrete product that includes an adaptive prestressing system.
Figure 1B:
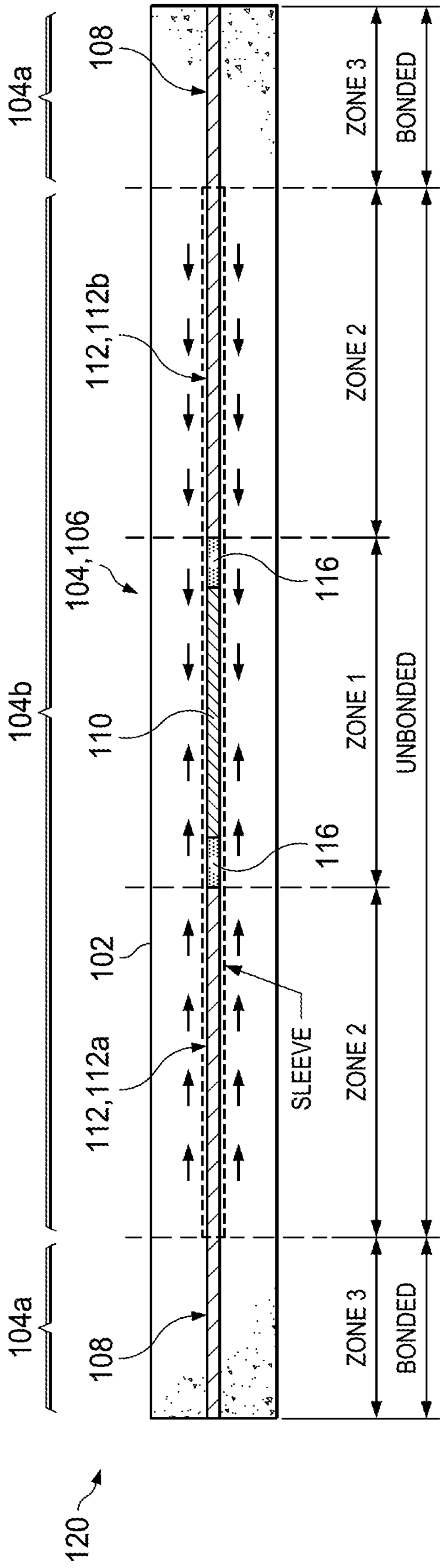
Figure 1C:
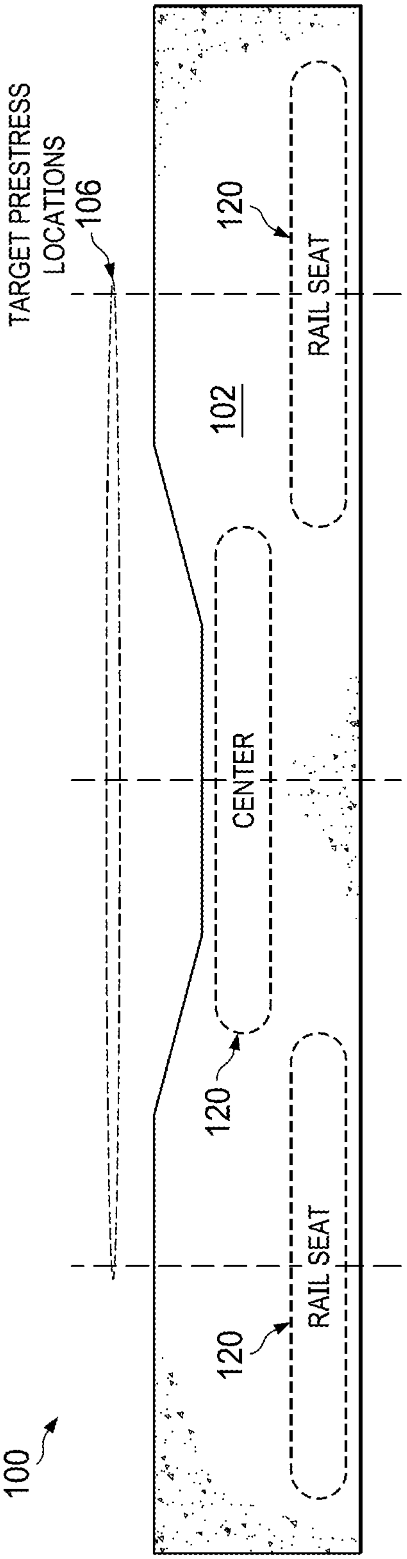
FIG. 1C shows target prestress locations within a concrete product (e.g., a railroad tie) that may benefit from incorporation of the adaptive prestressing system.

FIGS. 1A and 1B each show part of a concrete product (e.g., a railroad tie) 100 that includes an adaptive prestressing system 120. FIG. 1C shows target prestress locations within a railroad tie 100 that may benefit from incorporation of the adaptive prestressing system 120.

Referring now to FIGS. 1A and 1C, the concrete product 100 comprises a concrete body 102 and a composite wire 104 including a shape memory alloy (SMA) wire segment 110 which is activable to effect prestressing. The composite wire 104 is embedded in the concrete body 102 at a predetermined location 106 that may benefit from a compressive prestress when the concrete product 100 is in use. Such a concrete product 100 may be described as including an adaptive prestressing system 120.

The composite wire 104 includes end portions 104*a* anchored within the concrete body 102, where each of the end portions 104*a* comprises a steel wire segment 108 that is bonded to and/or otherwise constrained within the concrete body 102 to resist axial motion. Thus, the steel wire segment 108 may be referred to as a bonded wire segment 108. As shown on the right-hand side of FIG. 1A, the steel wire segment 108 may be connected to the SMA wire segment 110 by a robust connection mechanism 116 such as a weld, a mechanical connection (e.g., U-clamp, crimped tube, split-bolt connector) and/or an adhesive such as epoxy.

The composite wire 104 includes an activable central portion 104*b* between the end portions 104*a* that comprises the SMA wire segment 110 mentioned above. The activable central portion 104*b* is axially movable within the concrete body 102. When heated above an austenite transformation temperature, the SMA wire segment 110 contracts 110 and the activable central portion 104*b* exerts a force (e.g., a tensile or axial force) on the end portions 104*a* comprising the bonded steel wire segments 108, thereby prestressing the concrete body 102 in the predetermined location 106. Because the end portions 104*a* experience a tensile force by the contracting SMA wire segment 110, a compressive prestress is generated in the concrete body 102 at the predetermined location 106.

The SMA wire segment 110 comprises a shape memory alloy. Such alloys can "remember" and recover a previous shape due to a phase transformation between a lower temperature phase (martensite) and a higher temperature phase (austenite) that may be driven by heat. Strain (e.g., tensile strain) introduced into the alloy in the martensitic phase to achieve a shape/size change may be substantially recovered upon completion of a phase transformation to austenite, allowing the alloy to return to the previous shape/size. In this application, because the end portions 104*a* are bonded or otherwise anchored within the concrete body 102, the phase transformation and concomitant contraction experienced by the SMA wire segment 110 upon heating results in generation of a tensile force on the end portions 104*a* as described above.

As used herein, and as generally understood by one of skill in the art, martensite start temperature ($M_s$) is the temperature at which a phase transformation to martensite begins upon cooling for a shape memory alloy exhibiting a martensitic phase transformation. Martensite finish temperature ($M_f$) is the temperature at which the phase transformation to martensite concludes upon cooling. Austenite start temperature ($A_s$) is the temperature at which a phase transformation to austenite begins upon heating for a shape memory alloy exhibiting an austenitic phase transformation, and austenite finish temperature ($A_f$) is the temperature at which the phase transformation to austenite concludes upon heating.

Figure 2A:
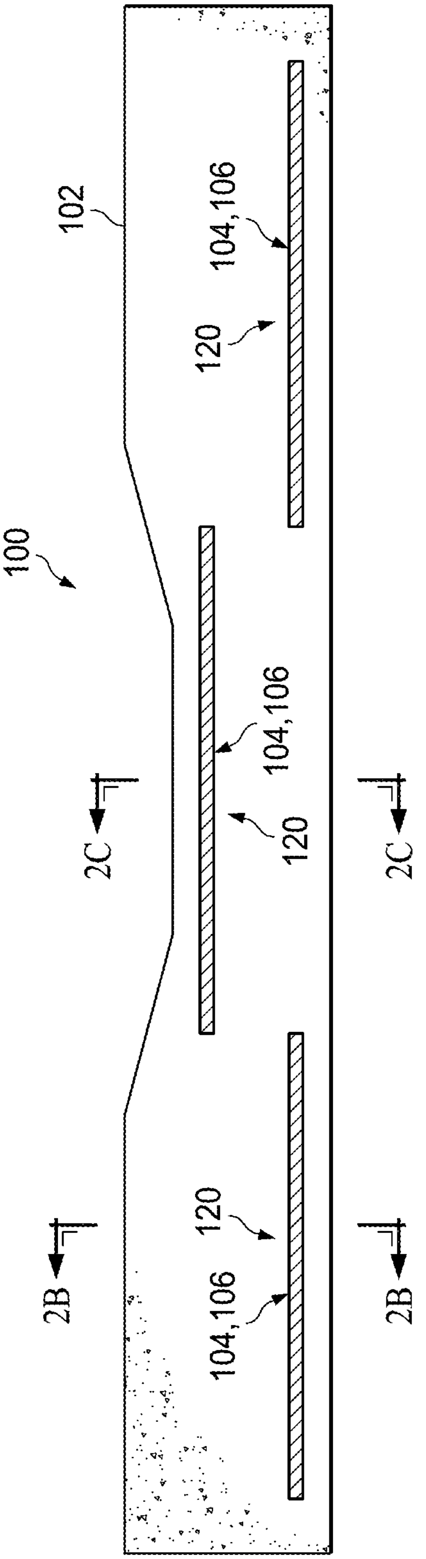
FIGS. 2A-2C show different views of an exemplary railroad tie test specimen including multiple composite wires embedded therein.
Figure 2B:
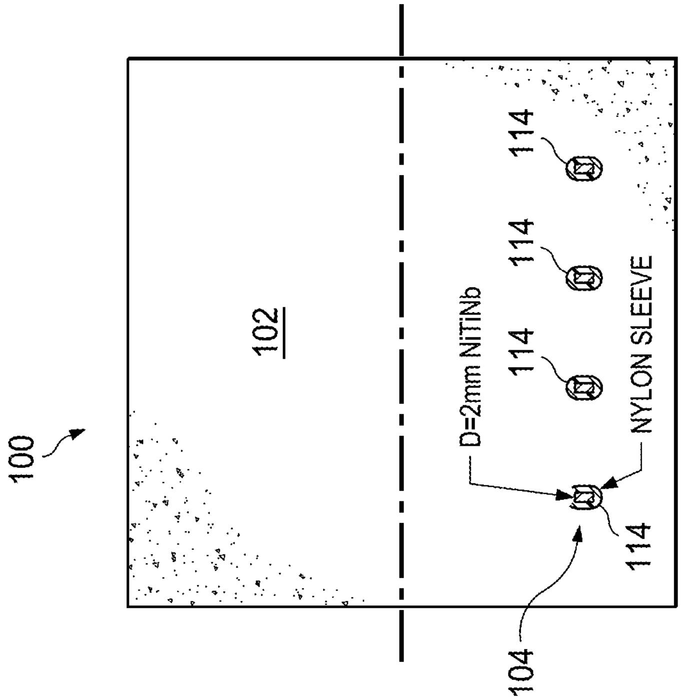
Figure 2C:
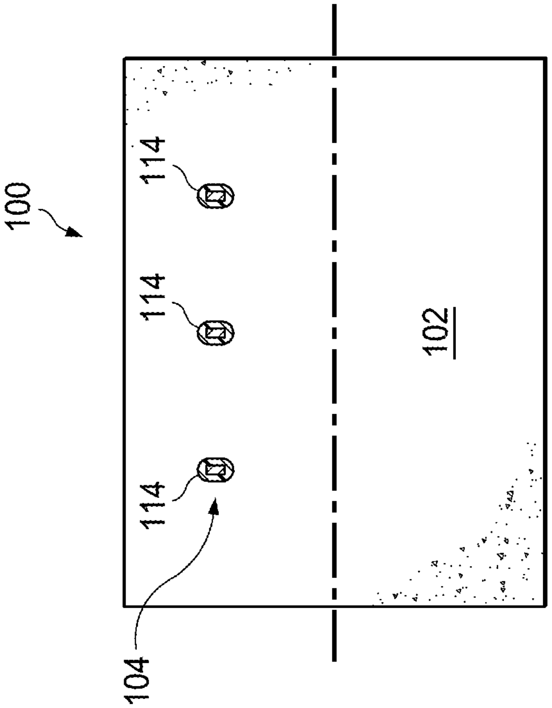

A number of the composite wires 104 may be incorporated into the concrete body 102 in different locations along the length and with respect to a centerline of the body 102, as illustrated in FIGS. 2A-2C, which show an exemplary railroad tie. Notably, each composite wire 104 extends for only a fraction of a total length of the concrete body 102, and each SMA wire segment of the composite wire 104 may account for only a small fraction of a total length of the composite wire 104. In other examples (see FIG. 4A), the composite wire(s) may be embedded in the composite body 102 along a depth direction (or along an arbitrary direction) within the body 102, as needed. As shown by the longitudinal cross-section of FIG. 2A and the transverse cross-sections of FIGS. 2B and 2C, the concrete product 100 may include from one to 20 (or even more) of the composite wires 104, where each wire 104 is embedded in a location that may benefit from a compressive prestress. One benefit of the adaptive prestressing system 120 is that the composite wire(s) 104 may be embedded in the concrete body 102 during fabrication, but the localized compressive prestress need not be activated until later, such as when the concrete product 100 is in use in the field.

Figure 3:
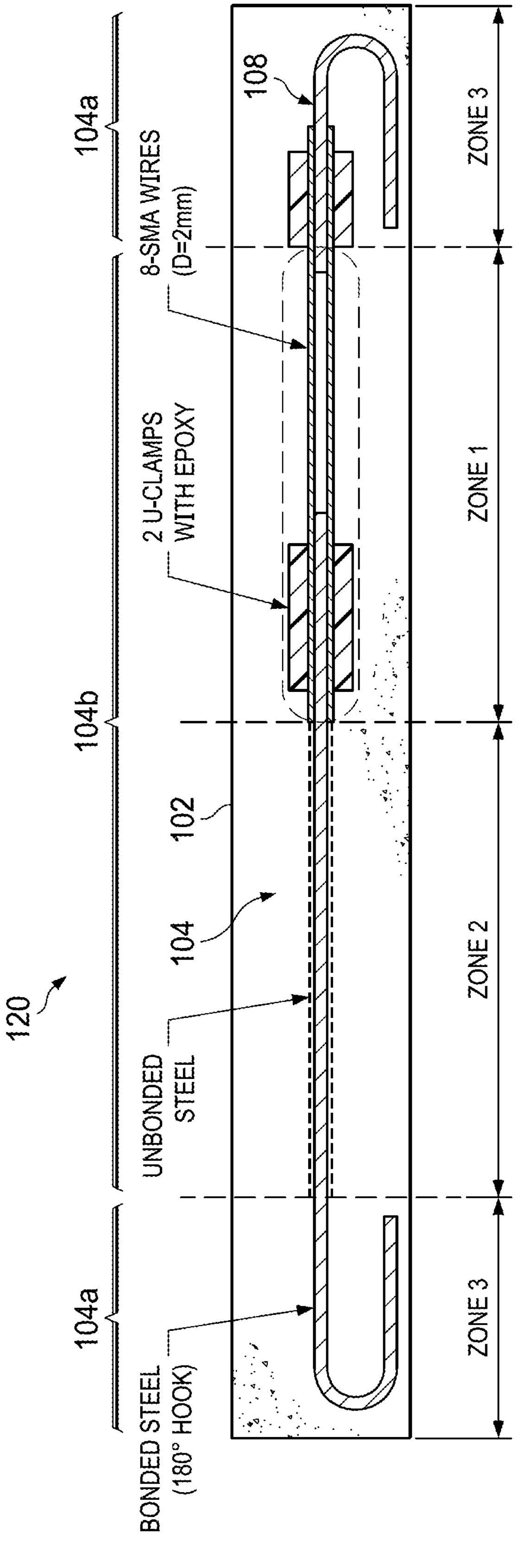
FIG. 3 shows a concrete test specimen including an adaptive prestressing system where the composite wire includes a 180 degree bend for anchoring the end portion.

The bonded wire segment 108 in each of the end portions 104*a* may have a bent geometry and/or surface features configured to engage with the concrete body 102 while under axial forces to ensure bonding or anchoring. For example, the bonded wire segment 108 may include a bend of 90° or greater, as illustrated in FIG. 3, which may be understood to show either part of a concrete product 100 including an adaptive prestressing system 120 or a simple concrete test specimen including an adaptive prestressing system 120 (as discussed below). In this example, the bonded wire segment 108 includes a 180 degree bend to anchor the end portion 104*a* into the concrete body 102. Also or alternatively, the bonded wire segment 108 may include surface features such as ribs, corrugations, and/or bumps. The surface features may be integrally formed with the bonded wire segment 108 or may be added on (e.g., by attachment of a U-clamp).

To ensure that the activable central portion 104*b* of the composite wire 104 is axially movable, it may be separated from the concrete body 102 by a sleeve 114 having a low-friction inner surface, as illustrated in FIGS. 2B and 2C, and/or by a lubricant and/or lubricious coating. Suitable lubricants/lubricious coatings may comprise oil, grease, wax and/or a solid lubricant, such as polytetrafluoroethylene (PTFE), nylon, or graphite. Suitable sleeves 114 may comprise nylon or PTFE, for example, at least on the inner surface. "Low-friction" or "lubricious" may be used to describe a material having a coefficient of friction at or below that of the exemplary lubricants/materials mentioned above. The sleeve 114 may include corrugations or other surface features on an outer surface thereof to engage with the surrounding concrete, while the low-friction inner surface may allow for axial motion of the central portion 104*b* of the wire 104 within the sleeve 114. Optionally, the outer surface of the sleeve 114 may be bonded within the concrete body 102 with grout or another adhesive material.

Referring again to FIG. 1A, the activable central portion 104*b* typically includes a steel wire segment 112 connected to one end of the SMA wire segment 110. The steel wire segment 112 may be connected to the SMA wire segment 110 by a robust connection mechanism 116, such as a weld, a mechanical connection (e.g., U-clamp, crimped tube, split-bolt connector) and/or an adhesive such as epoxy. Like the SMA wire segment 110, the steel wire segment 112 in the activable central portion 104*b* is not bonded to or constrained within the concrete body 102 and thus may be referred to as an unbonded wire segment 112. Accordingly, both the unbonded wire segment 112 and the SMA wire segment 110 are free to move axially when the SMA wire segment 110 is activated, and both may be enclosed within a sleeve and/or coated with a lubricant as described above. Accordingly, the sleeve 114 may have a shape designed to accommodate the wire segments 110,112 and connection mechanism(s) 116, as discussed below. The incorporation of a steel wire segment 112 in the activable central portion 104*b* may be beneficial due to the typically lower cost of steel wire as compared to SMA wire.

As illustrated in FIG. 1B, the activable central portion 104*b* may in some cases include two unbonded segments 112: a first steel wire segment 112*a* connected to a first end of the SMA wire segment 110 and a second steel wire segment 112*b* connected to a second end of the SMA wire segment 110. Connections between the SMA wire segment 110 and the unbonded wire segments 112 may be made using the connection mechanism(s) 116 described above. Both the first and second steel wire segments 112*a*, 112*b* may be enclosed within a sleeve or coated with a lubricant to ensure freedom of axial motion. The bonded and unbonded wire segments 108,112 may be part of a single steel wire that extends through the anchored end portion 104*a* and into the activable central portion 104*b*. Only the unbonded wire segment 112 may be covered with a sleeve.

Figure 4A:
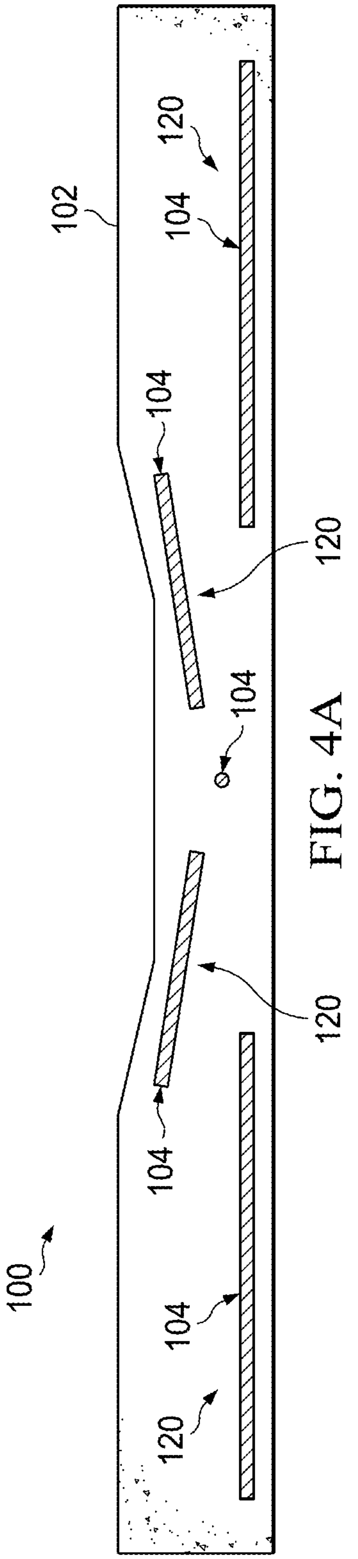
FIG. 4A is a schematic of a railroad tie including composite wires having different orientations within the concrete body.

As described above, multiple composite wires 104 may be embedded in the concrete body 102 at different predetermined locations 106. In some examples, the composite wire(s) 104 may be oriented along a length (or longitudinal) direction of the concrete body 102, as illustrated in FIG. 2A. Alternatively, the composite wire(s) 104 may be oriented along an arbitrary direction of the concrete body 102, as shown in FIG. 4A for two of the composite wires 104. Typically, each of the composite wires 104 has a length less than a total length of the concrete body 102 (e.g., from about 1% to about 50%, from about 2% to about 20%, or from about 5% to about 10%, of the total length). Also shown in FIG. 4A is a composite wire 104 oriented along a depth (or lateral) direction of the concrete body; in this case, the composite wire 104 typically has a length less than a total depth or width of the concrete body 102 (e.g., from about 1% to about 50%, from about 2% to about 20%, or from about 5% to about 10%, of the total depth or width).

Figure 4B:
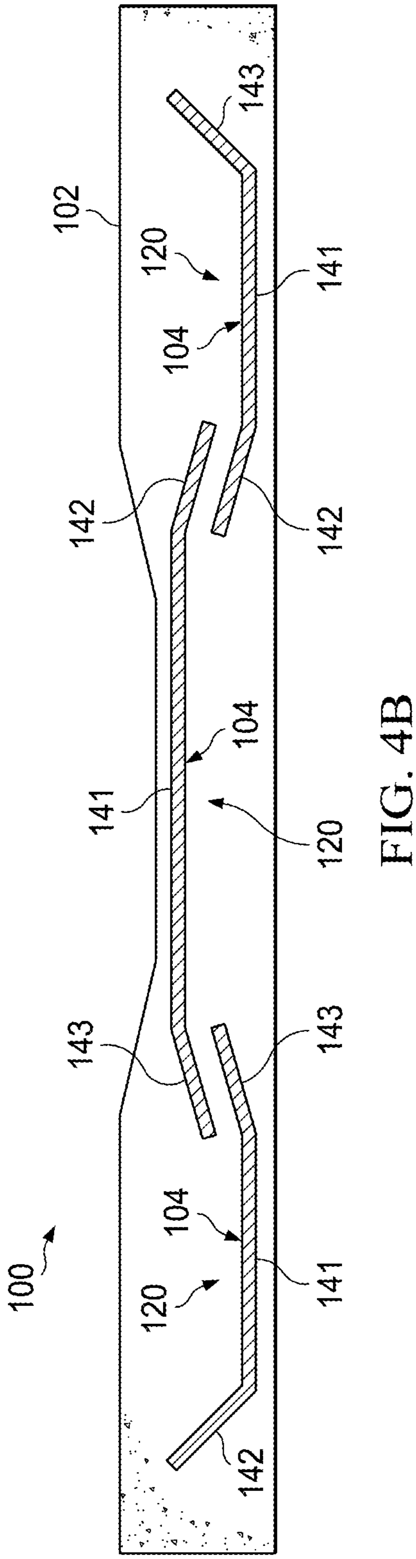
FIG. 4B is a schematic of a railroad tie including composite wires having deformed or nonlinear shapes so as to be oriented along more than one direction within the concrete body.

It is also contemplated that the composite wire(s) 104 may have a deformed or non-linear shape so as to be oriented along more than one direction. For example, referring to FIG. 4B, the composite wire 104 may have a first portion 141 extending along a first direction (e.g., the longitudinal direction) and a second portion 142 extending along a second direction (e.g., an off-axis or arbitrary direction). As shown, the composite wire may further comprise a third portion 143 extending along a third direction, which may be an off-axis or arbitrary direction.

The number of composite wire(s) 104 and the position and orientation of each within the concrete body 102 may be selected based on the prestressing needs of the concrete product 100. It is contemplated that a composite wire may include multiple strands of the SMA wire segment and/or the steel segments. For example, one or more SMA wire segments may be connected to one or more steel segments by the connection mechanism(s) described above. It is also understood that the composite wire and its component wire segments may be formed from wire(s), cable(s), and/or bar(s) that are linear or non-linear in shape.

The SMA wire segment 110 may comprise a shape memory alloy selected from a nickel-titanium alloy (e.g., a Ni—Ti—Nb alloy), an iron-manganese-silicon alloy, an iron-nickel-cobalt-titanium alloy, a copper-zinc-aluminum alloy, and/or a copper-aluminum-nickel alloy. Shape memory alloys have been shown to be resistant to creep at temperatures below 250° C., and they may be highly resistant to corrosion, making them attractive for outdoor uses even in harsh environments. Preferably the SMA wire segment exhibits a large thermal hysteresis, such as at least about 80° C. or at least about 100° C., to ensure that the prestressing may be maintained during use (e.g., in the field). The steel wire segment 108,112 may comprise a high tensile strength material such as steel or another metal alloy having suitable properties.

Now that a concrete product comprising an adaptive prestressing system has been described, a method of locally prestressing such a product is explained below.

The method includes providing a concrete product that comprises a concrete body with a composite wire embedded therein at a predetermined location, where the composite wire includes an SMA wire segment as described above, and heating the SMA wire segment to at least an austenite transformation temperature thereof to induce contraction of the SMA wire segment. As a consequence of the heating, the activable central portion of the composite wire exerts a tensile force on the end portions, and a compressive prestress is applied within the concrete body at the predetermined location. The method is applicable to concrete products having any of the characteristics described in this disclosure.

The austenite transformation temperature may comprise an $A_s$ temperature and/or an $A_f$ temperature of the SMA wire segment. Heating the SMA wire segment may comprise heating part or all of the concrete body; that is, the heating may entail localized or global heating. For example, the entire concrete product may be placed into a furnace. Alternatively, induction heating or resistive heating may be employed to heat just part of the component; for example, an electrical current may be passed through the SMA wire segment. In this example, the component may further include lead wires partially embedded in the concrete body; typically the lead wires have embedded ends electrically connected to the SMA wire segment and exposed ends configured for electrical connection to an external power source.

The method may further include halting the heating without a loss in the tensile force on the end portions (or the compressive prestress generated within the concrete body at the predetermined location). In other words, the tensile force and consequently the compressive prestress can be maintained after the heating is halted. This may be achieved by ensuring that the $M_s$ and $M_f$ temperatures of the SMA wire segment are lower than temperatures to which the component is exposed in use (e.g., in the field). For example, the $M_s$ and/or $M_f$ temperatures may be well below typical outdoor temperatures, such as below −30° C., below −40° C., or below −50° C.

Similarly, the $A_s$ and $A_f$ temperatures of the SMA wire segment may be above typical indoor and/or outdoor temperatures to ensure that the transformation from martensite to austenite to induce contraction of the SMA wire segment does not commence prematurely. For example, one or both of the $A_s$ and $A_f$ temperatures may be above 40° C., above 45° C., or above 50° C. Consistent with this, suitable SMA wire segments may exhibit a large thermal hysteresis, such as at least about 80° C., or at least about 100° C.

A method of making a concrete product comprising an adaptive prestressing system is described below. The method may include forming a shape memory alloy (SMA) wire segment into a tensioned or elongated shape. In other words, a tensile stain may be applied to the SMA wire segment to ensure that contraction occurs during the heating described above. During the forming step, the SMA wire segment is martensitic and thus readily deformable. Prior to forming the SMA wire segment into the tensioned shape, the SMA wire segment of the composite wire may undergo a heat setting process as known in the art in order to impart a "memory" of the pre-tensioned configuration. This is the configuration to which the SMA wire segment may return upon heating at or above the austenite transformation temperature, so as to produce a tensile force that leads to localized prestressing, as discussed above.

The method may further include forming a composite wire comprising the SMA wire segment, typically after introducing tensile strain to the SMA wire segment. Forming the composite wire may comprise connecting the SMA wire segment to one or more steel wire segments as described above. Also or alternatively, a sleeve or lubricant may be applied over the SMA wire segment and, in some cases, over at least a portion of the one or more steel wire segments.

The composite wire may then be positioned within a mold, and a concrete mix may be poured into the mold and over the composite wire (and over the sleeve or lubricant). The concrete mix may be cured to obtain a concrete body comprising the composite wire embedded at a predetermined location therein, thereby forming the concrete product including an adaptive prestressing system. The curing may occur over a time period from about 14 days to about 28 days, typically. Suitable compositions for the concrete mix are known in the art. Before or after curing is completed, the concrete product may be removed from the mold and stored or shipped, as desired. Once sufficient curing has taken place to allow for any desired bonding between the concrete and the steel wire segments, the composite wire may be described as including anchored end portions, each of which comprises a steel wire segment ("bonded wire segment") constrained within the concrete body to resist axial motion, and an activable central portion between the end portions that comprises the SMA wire segment and is axially movable within the concrete body.

The method may further comprise installing the concrete product at a field location, and heating the SMA wire segment at or above the austenite transformation temperature to induce contraction of the SMA wire segment. Assuming proper selection of the transformation temperatures of the SMA wire segment, as explained above, it is not necessary to maintain the heating in order to maintain the compressive prestress. Thus, the method may include halting the heating without a concomitant loss or decrease in the compressive prestress.

The concrete product may be a railroad tie, bridge girder, roof slab, floor slab, pavement, pole, a wall panel or another concrete structure or component. Over the service life of the product, the compressive prestress can be monitored occasionally or frequently by measuring the electrical resistivity of the SMA wire segments, and adjustments may be made as needed (by heating as described above) without taking the concrete product out of service. The concrete product may undergo millions of load cycles and face varied support conditions throughout its lifetime, which can result in creep of the concrete and/or other issues that may lead to prestress variation. The ability to change the compressive prestress as needed may help to improve the performance and safety of the concrete product and lead to an extended service life.

EXAMPLES

Concrete Body Including SMA Wire Segments

Concrete specimens including embedded SMA wire segments and having a geometry representative of a typical concrete crosstie are fabricated and tested. The locations where prestressing is beneficial are the bottoms of the rail seat regions and the top of the center regions. The dimensions shown in the figures and/or described below are applicable to an exemplary test specimen, but the dimensions may be varied as desired to manufacture large-scale railroad ties and/or other concrete products 100.

Referring to FIGS. 2A-2C, the length of each crosstie specimen may be 30 in, the width of the section may be 3 in throughout the length of the tie, and the height of the section may be 3 in and 2.3 in at rail seat and center region, respectively. 2 mm-diameter SMA wire segments comprising a nickel-titanium-niobium (Ni—Ti—Nb) alloy and having a constrained recovery stress of 550 MPa (79.77 ksi) and a recovery force of 0.3884 kip may be embedded in the crosstie specimens as described below. The recovery stress can be attained by heating the Ni—Ti—Nb wire segments up to 200° C. The concrete mix is designed in this example to target a strength of 3 ksi in 28 days. The activation of the SMA wire segments is done three days after casting, at which time the concrete strength is 2461.5 psi. The specimen is designed to have some equivalency to existing concrete crosstie designs. The design goal is to achieve a comparable amount of stress at the bottom of the critical section after prestressing.

Two SMA wire segments are bundled and wrapped with nylon sleeves which act as a debonding duct to concrete and as an insulator. In the rail seat sections (FIG. 2B), 4—(2) 2 mm-diameter Ni—Ti—Nb wire bundles are placed at 0.5 in from the bottom of the section with the spacing of 0.6 in. In the center sections (FIG. 2C), 3—(2) 2 mm-diameter Ni—Ti—Nb wire bundles are placed at 0.5 in from the top of the section with the spacing of 0.75 in. The designed sections can achieve 77.06% and 51.72% of the bottom stress of the real rail ties at the rail seat and center sections, respectively.

Figure 5A:
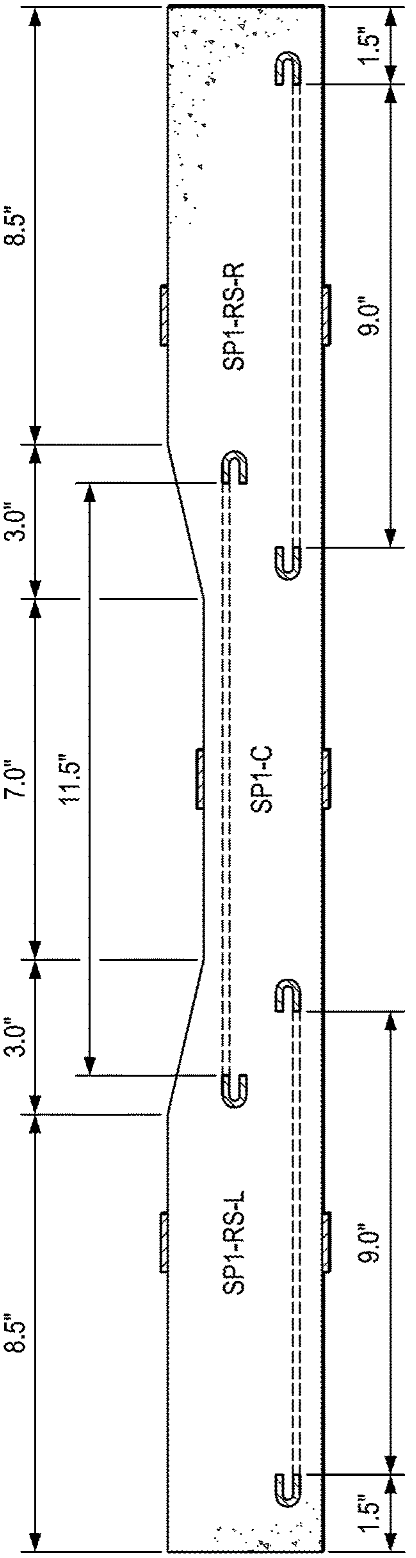
FIGS. 5A-5C show railroad tie test specimens including SMA wire segments having different wire geometries: straight, L-shaped, and U-shaped.
Figure 5B:
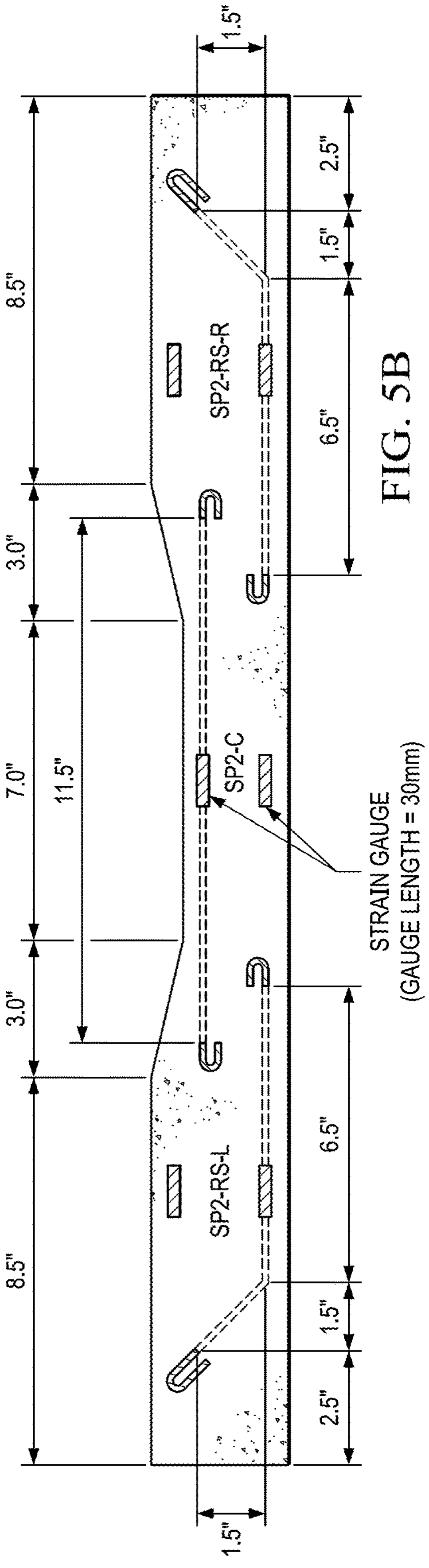
Figure 5C:
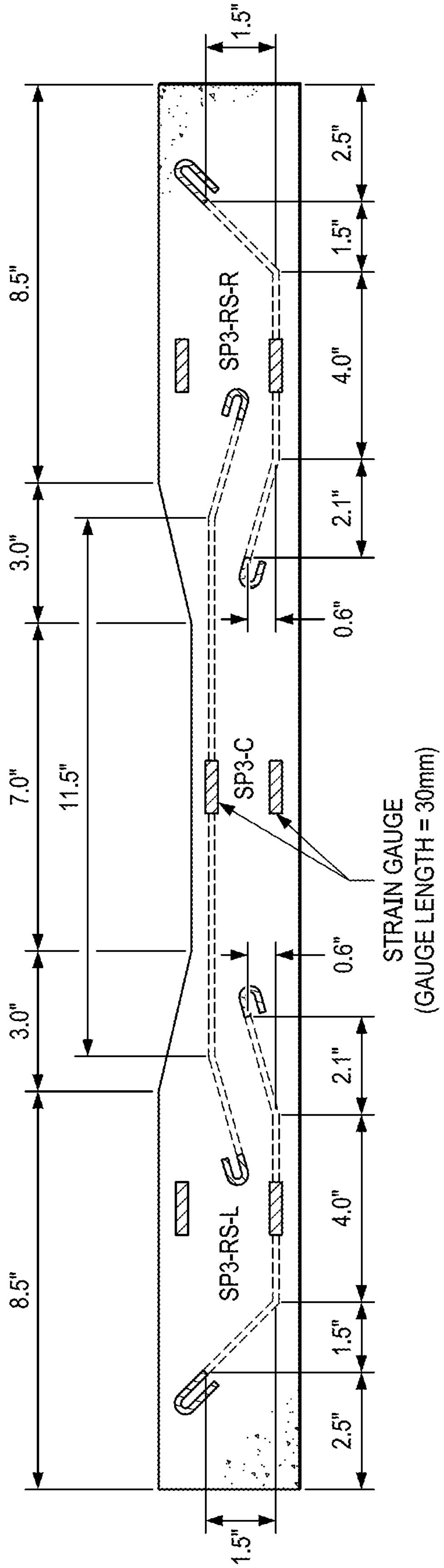

Referring now to FIGS. 5A-5C, three different wire geometries are designed: straight, L-shaped, and U-shaped in the specimens SP1, SP2, and SP3, respectively. The diagonal or off-axis segments of the L-shaped and U-shaped wire segments are designed to reinforce shear since the rail seat region may be prone to shear failure.

In the small-scale test, the strain distributions of the specimen are measured during and after the activation of the SMA wire segments. To measure the strain distribution at the surface of the specimen, the digital image correlation (DIC) technique is used. To verify the strain measure from the DIC, strain gauges are attached to the top and bottom of each section. The test is performed on one side of the tie at a time (left rail seat, center, and right rail seat) because of the limited resolution of the camera used in DIC. An electric current is used to heat the SMA wires via resistance heating. Copper lead wires are connected to the both ends of the SMA wire segments and form a closed circuit with a DC power supply. The temperature of the SMA wire segments is monitored during the heating. The tip of a thermocouple is in contact with the SMA wire segments, penetrating through the surrounding nylon sleeve. The DC power supply is disconnected if the temperature reaches 200° C. to prevent overheating.

Axial strain distributions from specimens SP1 and SP2 (FIGS. 5A and 5B) measured by DIC and obtained from finite element analysis are nearly identical. The shear strain distributions of specimens SP2 and SP3 (FIGS. 5B and 5C) have off-axis or diagonal components that contribute to the shear stress in the rail seat region. FIG. 6, which shows recovery stress as function of time, reveals that the SMA wire segments embedded in concrete (in the railroad tie test specimens) are applying the prestressing as designed.

Concrete Beam Specimen with Adaptive Prestressing System

A composite wire including series-connected steel and SMA wire segments is prepared using a connection mechanism as described above. The composite wire is embedded within concrete to form a concrete beam specimen that includes an adaptive prestressing system.

For the SMA wire segments, 2 mm-diameter Ni—Ti—Nb wires having a constrained recovery stress of $\sigma_{rec}$=79.77 ksi are used. For the steel wire segments, 5.32 mm-diameter low relaxation steel wire is used. For the connection mechanism, two U-clamps with epoxy are used. The adaptive prestressing system may be divided into three zones, as shown in FIG. 7 and also in FIG. 1A.

In this example, in zone 1, 8 SMA wire segments are connected to a steel wire segment in zone 2 as described above. In zone 2, a nylon sleeve covers the steel wire segment to ensure debonding from the surrounding concrete. In zone 3, steel wire segments are anchored by bonded length as well as the 180° curve. The length of zone 1 is selected to be 4 in, and zone 2 is selected to be 8 in for this example. The length of the connection mechanism is about 2 in and the steel and SMA wire segments overlap by 0.5 in both sides.

The composite wire including the steel and SMA wire segments is embedded in a concrete beam specimen for evaluation as illustrated in FIG. 3. The concrete beam specimen has a 3 in by 3 in cross section and is 24 in long. The composite wire is located generally at the centroid of the specimen; however, the part of the composite wire extending through zones 2 and 3 exhibit an upward tilt that is not shown in the schematic of FIG. 3. The cross sectional area of the specimen is 9 in$^2$ and the recovery force generated from the SMA wires is 3.11 kips; thus, the nominal prestress level at zone 2 is 0.345 ksi. The concrete mix is designed to meet a target strength of 5 ksi at 28 days.

The SMA wire segments in zone 1 of the composite wire may be activated by heat. To visually validate the activation of the SMA wire segments in zone 1, a void is created in the concrete adjacent to the composite wire in zone 1. This void is referred to as an "APS window" in this study. To form the APS window, a 3D printed sleeve designed by 3D CAD software is located in the mold when concrete is cast, so that concrete mix does not flow into zone 1. Through the APS window, heating of SMA wires in this example is done using a flame from a torch. During the activation of the SMA wires, a strain distribution of the front surface of the specimen is measured by DIC cameras located in front of the specimen. Strain at discrete points is measured by strain gauges attached at the top surface of the middle of zone 1 and zone 2.

Images of the axial and principal strain distribution obtained from DIC data and FE modeling show a good match. The images show that the center of zone 1 exhibits the highest compressive strain, while ends of the concrete beam specimen show the highest tensile strain. The DIC results verify that the embedded composite wire can apply prestress to the concrete beam at a target region.

Railroad Tie with Adaptive Prestressing System

Figure 8A:
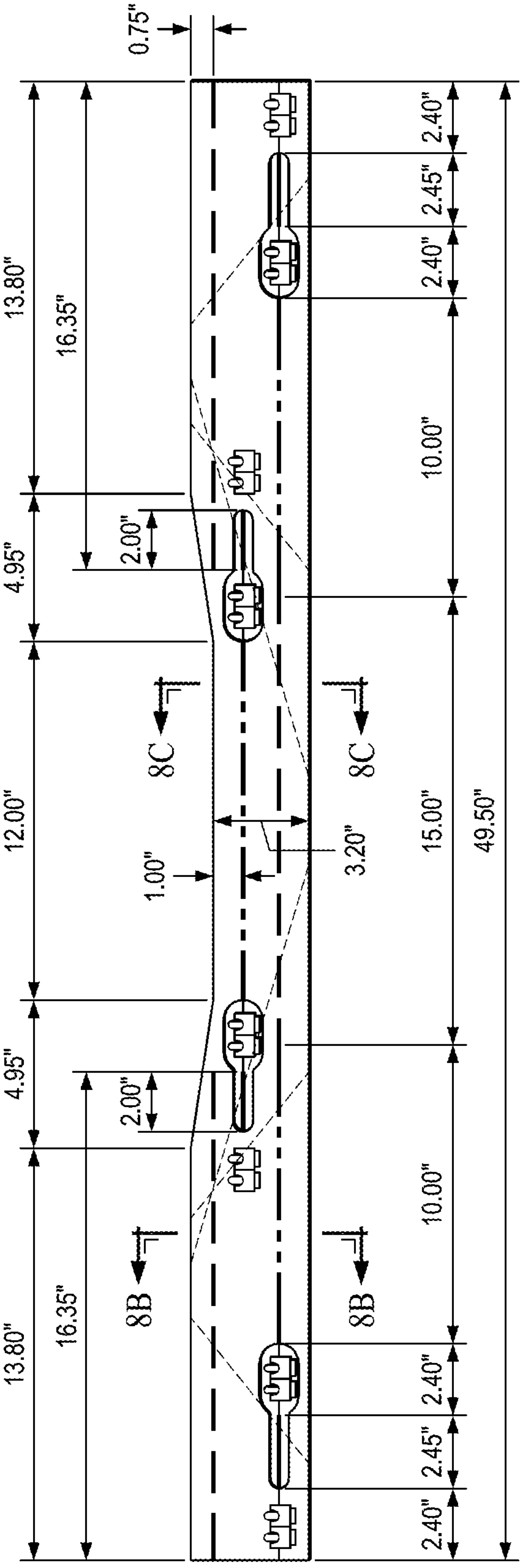
FIG. 8A shows a longitudinal cross-sectional view of a concrete railroad tie specimen including an adaptive prestressing system.
Figure 8C:
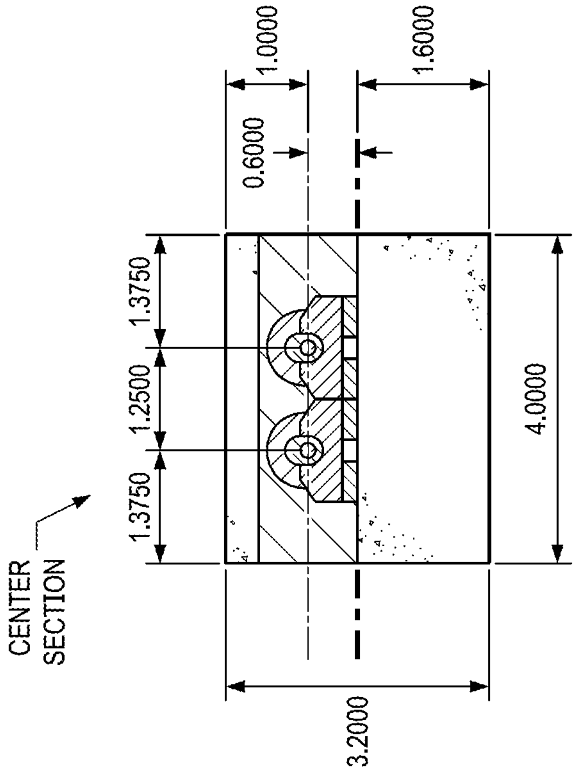
FIGS. 8B-8D show transverse cross-sectional views of parts of the specimen and system, which is designed to scale down to half of the American Railway Engineering and Maintenance-of-Way Association (AREMA) ch.13 based reference ties.
Figure 8D:
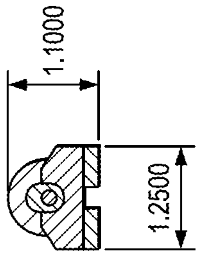
Figure 8B:
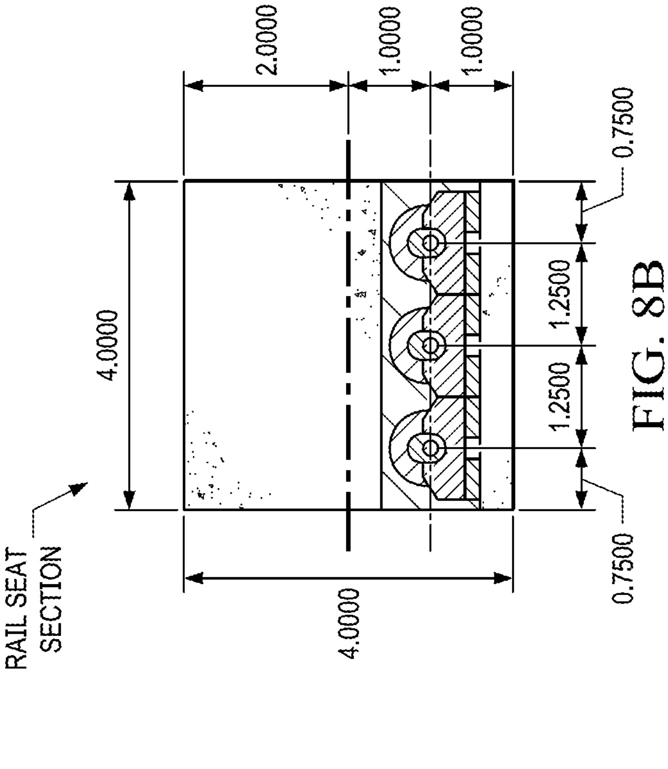

In a final set of tests, a concrete crosstie specimen including an adaptive prestressing system is fabricated and tested. The concrete crosstie specimen is designed to scale down to half of the American Railway Engineering and Maintenance-of-Way Association (AREMA) ch.13 based reference ties. The crosstie specimen has a 4 in width throughout the length, a 4 in height at the rail seat sections and a 3.2 in height at the center section. FIG. 8A shows a longitudinal cross-sectional view of the crosstie specimen, and FIGS. 8B-8D show transverse cross-sectional views of parts of the crosstie specimen. Three composite wires are used at the rail seat sections with one inch eccentricity, and two composite wires are used at the center section with 0.6 inch eccentricity. At the rail seat section, two 5.32 mm diameter low relaxation wires are bonded to provide reinforcement at the top of the section. The rail seat section is prestressed with zone 2 of the composite wire, and ends of composite wire are anchored with two U clamps. The middle of the composite wire is bonded to the concrete to provide anchorage. The center section is prestressed with zone 2 of the composite wire, with both ends anchored with two U-clamps.

As shown in Table 1, the area ratio of the composite wire is 1.13, the length ratio of the composite wire at the rail seat section is 0.25 and at center section is 0.31. The calculated recovery stress of the composite wire at the rail seat section is 66 ksi and at the center section is 68.4 ksi. At the rail seat sections, the prestress force induced by the recovery stress is applied one inch below the centroid of the section and 1.21 ksi of nominal compressive stress is applied at the extreme tensile fiber of the section. This nominal compressive stress at the extreme tensile fiber was 102.79% of the AREMA ch.13 based reference tie. At the center section, a prestress force is applied 0.6 inch above the centroid of the section and 1.00 ksi of nominal compressive stress is applied at the extreme tensile fiber of the section. This nominal compressive stress is 66.22% of the reference tie.

TABLE 1

Section Design of Railroad Tie Test Specimen

| Section | Area ratio $A_{SMA}/A_{Steel}$ — | Length ratio $L_{SMA}/L_{Steel}$ — | Recovery stress $\sigma_{SMA}$ ksi | Prestress at extreme tensile fiber $\sigma_{tens}$ ksi | Percent of equivalent stress at extreme tensile fiber eqv $\sigma_{tens}$ % |
|---|---|---|---|---|---|
| Rail seat | 1.13 | 0.25 | 66.00 | −1.21 | 102.79 |
| Center | 1.13 | 0.31 | 68.40 | −1.00 | 66.22 |

For the void region at zone 1 of the composite wire, a key hole shaped 3D printed sleeve is designed to fit the two U-clamps. The void is designed to visually validate the application of the prestress during the activation of the composite wire to be grouted after the activation for service. The surface of the sleeve is corrugated to avoid slippage at the interface of the grout. The 3D printed sleeve is assembled to surround zone 1 of the composite wire and located in the mold as designed before casting. Concrete is cast and the crosstie specimen is demolded after 24 hours. The design concrete strength is 7 ksi at 28 days.

Tests are performed with the crosstie specimen including the adaptive prestressing system after curing. The crosstie specimen is steam cured for 21 days to reduce creep and shrinkage of the concrete. After 21 days, the test specimen is dried and the front surface is painted with a white paint and speckle patterns were applied. Strain gauges are attached to the top and bottom of rail seat sections and the center section. The SMA wire segments are activated after 28 days of curing. Activation is done by applying heat using torch flames to the SMA wire segments through the void at zone 1. Heating is done one section at a time separately, and a DIC camera captures the activated section during the heating process. Each section is heated twice for 10 seconds with one hour of cooling time interval. Referring to the top of FIG. 9, rail seat left section (RS_L) is first heated; after two hours of heating, rail seat right section (RS_R) is heated, and lastly center section (C) is heated. During the activation test, the strain distribution of the front surface, as well as the strains at discrete points at each section are measured.

Figure 9:
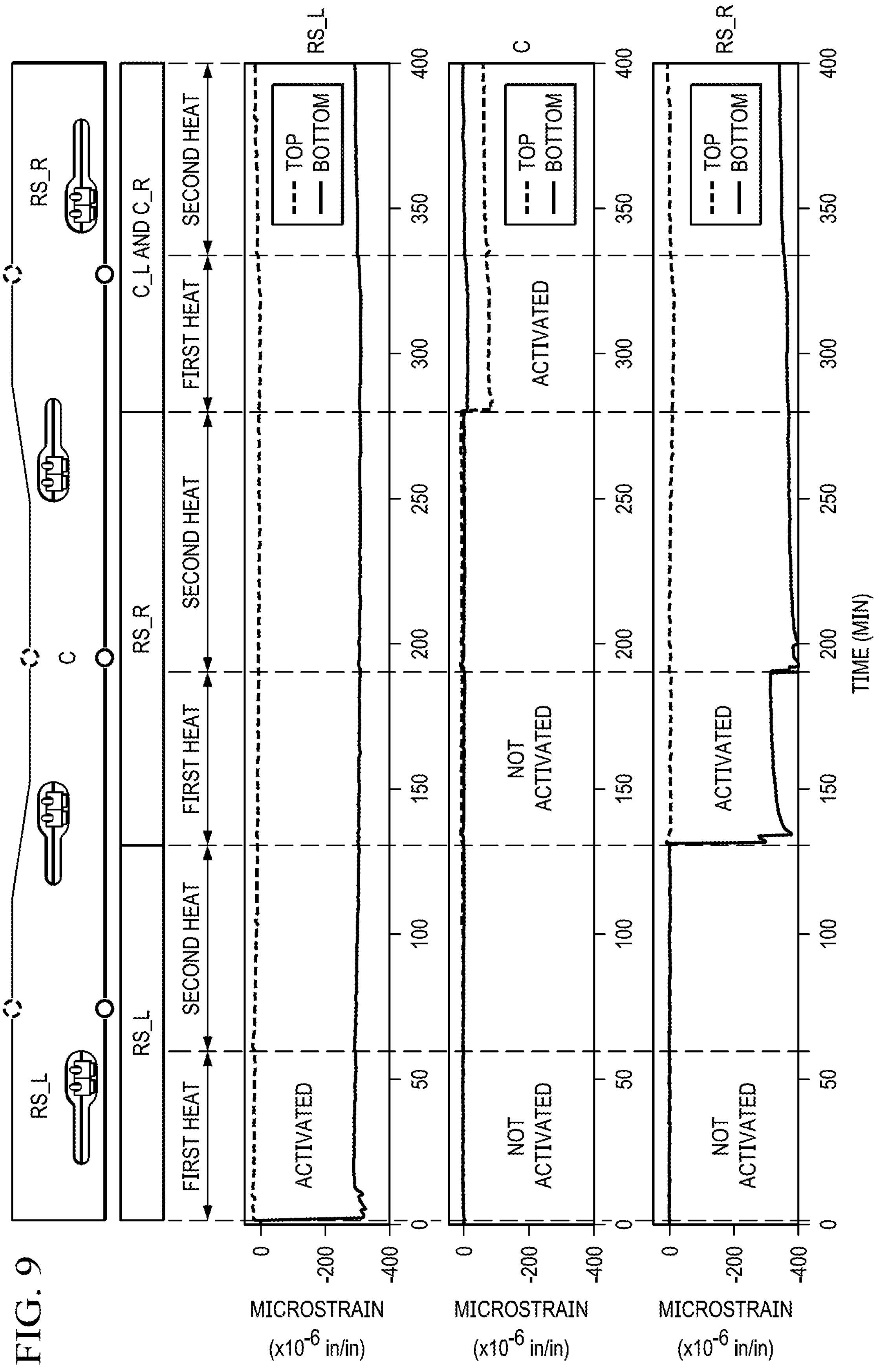
FIG. 9 shows the time history of strains measured during heating of the SMA wire segment(s) in each section of the crosstie specimen of FIGS. 8A-8C.

FIG. 9 shows the time history of strains measured from strain gauges in regions RS_L, C, and RS_R. Dashed lines represent the top strains and solid lines represent the bottom strains. RS_L is first heated twice at time 0 min and 60 min and cooled down until 120 min. As shown in FIG. 9, bottom strain increases instantaneously to negative, meaning compressive strain and top strain increased to positive, meaning tensile strain. After the peak, the strain level is stabilized to a certain level as the composite wire cools down. After 120 min, RS_R is heated twice at time 120 min and 180 min and cooled down until 270 min. As shown in FIG. 9, bottom strain increases instantaneously after the application of heat to compressive strain, and top strain increases to tensile strain just like RS_L at 0 min. Strain levels at RS_L and RS_R after 240 min are almost identical to each other, which means an equal amount of prestress is applied to the left and right sides of the rail seat. After time 270 min, C is heated twice at 270 min and 330 min. Similar but oppositely, top strain is increased to compressive strain and the bottom strain is increased to tensile strain right after the application of heat.

FIG. 9 shows that application of heat at one section does not affect the strains at other sections, which means the adaptive prestressing systems are independent of each other and each may independently apply local prestressing at the target regions of the concrete product.

The subject matter of the disclosure may also relate to the following aspects:

A first aspect relates to a concrete product comprising an adaptive prestressing system, the concrete product comprising: a concrete body; a composite wire embedded within the concrete body at a predetermined location, the composite wire including: anchored end portions, each of the anchored end portions comprising a bonded wire segment constrained within the concrete body to resist axial motion; and an activable central portion between the end portions, the activable central portion comprising a shape memory alloy (SMA) wire segment and being axially movable within the concrete body, wherein, when heated at or above an austenite transformation temperature, the SMA wire segment contracts and the activable central portion exerts a tensile force on the end portions, thereby applying a compressive prestress within the concrete body at the predetermined location.

A second aspect relates to the concrete product of the first aspect, wherein the bonded wire segments comprise steel wire segments.

A third aspect relates to the concrete product of the first or second aspect, wherein one or both of the bonded wire segments comprise a bent geometry.

A fourth aspect relates to the concrete product of any one of the first through the third aspects, wherein one or both of the bonded wire segments comprise surface features configured to engage with the concrete body while under axial forces.

A fifth aspect relates to the concrete product of any one of the first through the fourth aspects, wherein the activable central portion is separated from the concrete body by a low-friction sleeve so as to be axially movable.

A sixth aspect relates to the concrete product of any one of the first through the fifth aspects, wherein the activable central portion is separated from the concrete body by a lubricant or a lubricious coating so as to be axially moveable.

A seventh aspect relates to the concrete product of any one of the first through the sixth aspects, wherein the activable central portion further comprises a first steel wire segment connected to a first end of the SMA wire segment, the first steel wire segment being an unbonded wire segment configured for axial motion.

An eighth aspect relates to the concrete product of the seventh aspect, wherein the unbonded wire segment is connected to the first end of the SMA wire segment by a weld, a mechanical connection, and/or an adhesive.

A ninth aspect relates to the concrete product of any one of the first through the eighth aspects, comprising a plurality of the composite wires embedded in the concrete body at different predetermined locations.

A tenth aspect relates to the concrete product of any one of the first through the ninth aspects, wherein the composite wire has a length less than a total length of the concrete body.

An eleventh aspect relates to the concrete product of any one of the first through the tenth aspects, wherein the length of the composite wire is from about 1% to about 50% of the total length.

A twelfth aspect relates to the concrete product of any one of the first through the eleventh aspects, further comprising lead wires partially embedded in the concrete body, wherein embedded ends of the lead wires are electrically connected to the SMA wire segment, and wherein exposed ends of the lead wires are configured for electrical connection to an external power source.

A thirteenth aspect relates to the concrete product of any one of the first through the twelfth aspects, wherein the SMA wire segment comprises a shape memory alloy.

A fourteenth aspect relates to the concrete product of any one of the first through the thirteenth aspects being selected from the group consisting of: railroad tie, bridge girder, roof slab, floor slab, pavement, pole, and wall panel.

A fifteenth aspect relates to a method of locally prestressing a concrete product comprising an adaptive prestressing system, the method comprising: heating the SMA wire segment of the concrete product of any preceding aspect at or above an austenite transformation temperature thereof to induce contraction of the SMA wire segment, the activable central portion comprising the SMA wire segment thereby exerting a tensile force on the end portions, whereby a compressive prestress is applied within the concrete body at the predetermined location.

A sixteenth aspect relates to the method of the fifteenth aspect, wherein the austenite transformation temperature comprises an austenite start ($A_s$) temperature and/or an austenite finish ($A_f$) temperature of the SMA wire segment.

A seventeenth aspect relates to the method of the fifteenth or sixteenth aspect, wherein heating the SMA wire segment comprises heating part or all of the concrete body.

An eighteenth aspect relates to the method of any one of the fifteenth through the seventeenth aspects, wherein heating the SMA wire segment comprises passing an electric current through the SMA wire segment.

A nineteenth aspect relates to the method of any one of the fifteenth through the eighteenth aspects, further comprising halting the heating, the compressive prestress being maintained after the heating is halted.

A twentieth aspect relates to a method of making a concrete product comprising an adaptive prestressing system, the method comprising: forming a shape memory alloy (SMA) wire segment into an elongated shape, the SMA wire segment being martensitic; forming a composite wire including the SMA wire segment; positioning the composite wire within a mold; pouring a concrete mix into the mold and over the composite wire; and curing the concrete mix to obtain a concrete body comprising the composite wire embedded at a predetermined location therein, thereby forming a concrete product including an adaptive prestressing system.

A twenty-first aspect relates to the method of the twentieth aspect, wherein, upon curing, the composite wire includes: anchored end portions, each of the anchored end portions comprising a bonded wire segment constrained within the concrete body to resist axial motion; and an activable central portion between the end portions, the activable central portion comprising the SMA wire segment and being axially movable within the concrete body.

A twenty-second aspect relates to the method of the twentieth or twenty-first aspect, further comprising: installing the concrete product at a field location, and heating the SMA wire segment at or above an austenite transformation temperature thereof to induce contraction of the SMA wire segment, the activable central portion comprising the SMA wire segment thereby exerting a tensile force on the end portions, whereby a compressive prestress is applied within the concrete body at the predetermined location.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A concrete product comprising an adaptive prestressing system, the concrete product comprising:

a concrete body;

a composite wire embedded within the concrete body at a predetermined location, the composite wire including:

anchored end portions, each of the anchored end portions comprising a bonded wire segment comprising a steel wire segment constrained within the concrete body to resist axial motion; and an activable central portion between the anchored end portions, the activable central portion comprising a shape memory alloy (SMA) wire segment and being axially movable within the concrete body, the SMA wire segment comprising a SMA selected from the group consisting of nickel-titanium alloy, iron-manganese-silicon alloy, an iron-nickel-cobalt-titanium alloy, a copper-zinc-aluminum alloy, and a copper aluminum-nickel-alloy, wherein, when heated at or above an austenite transformation temperature, the SMA wire segment contracts and the activable central portion exerts a tensile force on the anchored end portions, thereby applying a compressive prestress within the concrete body at the predetermined location.

2. The concrete product of claim 1, wherein one or both of the bonded wire segments comprise a bent geometry.

3. The concrete product of claim 1, wherein one or both of the bonded wire segments comprise surface features configured to engage with the concrete body while under axial forces.

4. The concrete product of claim 1, wherein the activable central portion is separated from the concrete body by a low-friction sleeve so as to be axially movable.

5. The concrete product of claim 1, wherein the activable central portion is separated from the concrete body by a lubricant or a lubricious coating so as to be axially moveable.

6. The concrete product of claim 1, wherein the activable central portion further comprises a first steel wire segment connected to a first end of the SMA wire segment, the first steel wire segment being an unbonded wire segment configured for axial motion.

7. The concrete product of claim 6, wherein the unbonded wire segment is connected to the first end of the SMA wire segment by a weld, a mechanical connection, and/or an adhesive.

8. The concrete product of claim 1, comprising a plurality of the composite wires embedded in the concrete body at different predetermined locations.

9. The concrete product of claim 1, wherein the composite wire has a length less than a total length of the concrete body.

10. The concrete product of claim 9, wherein the length of the composite wire is from about 1% to about 50% of the total length.

11. The concrete product of claim 1, further comprising lead wires partially embedded in the concrete body, wherein embedded ends of the lead wires are electrically connected to the SMA wire segment, and wherein exposed ends of the lead wires are configured for electrical connection to an external power source.

12. The concrete product of claim 1 being selected from the group consisting of: railroad tie, bridge girder, roof slab, floor slab, pavement, pole, and wall panel.

13. A method of locally prestressing a concrete product comprising an adaptive prestressing system, the method comprising:

heating the SMA wire segment of the concrete product of claim 1 at or above an austenite transformation temperature thereof to induce contraction of the SMA wire segment, the activable central portion comprising the SMA wire segment thereby exerting a tensile force on the anchored end portions, whereby a compressive prestress is applied within the concrete body at the predetermined location.

14. The method of claim 13, wherein heating the SMA wire segment comprises heating part or all of the concrete body.

15. The method of claim 13, wherein heating the SMA wire segment comprises passing an electric current through the SMA wire segment.

16. The method of claim 13, further comprising halting the heating, the compressive prestress being maintained after the heating is halted.

17. The concrete product of claim 1, wherein the composite wire and component wire segments are formed from wire(s), cable(s), and/or bar(s) that are linear or non-linear in shape.

18. The method of claim 13, wherein the composite wire and component wire segments are formed from wire(s), cable(s), and/or bar(s) that are linear or non-linear in shape.

* * * * *